Nov. 25, 1952

A. E. GEIGER ET AL 2,619,274

FLUID FEEDING APPARATUS

Filed Jan. 27, 1950

INVENTORS
A.E.GEIGER
H.ONALI

BY W.C.Parnell

ATTORNEY

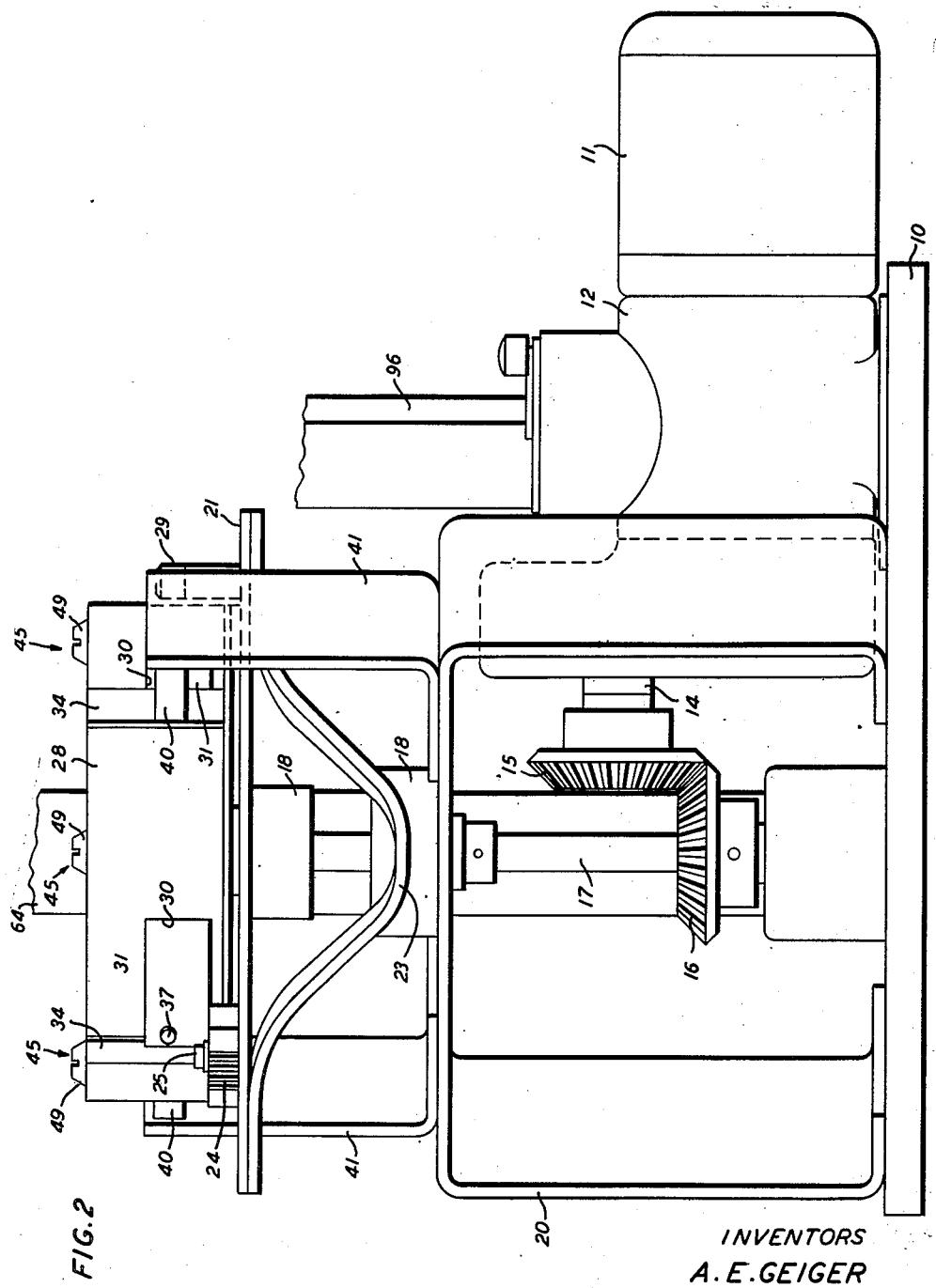

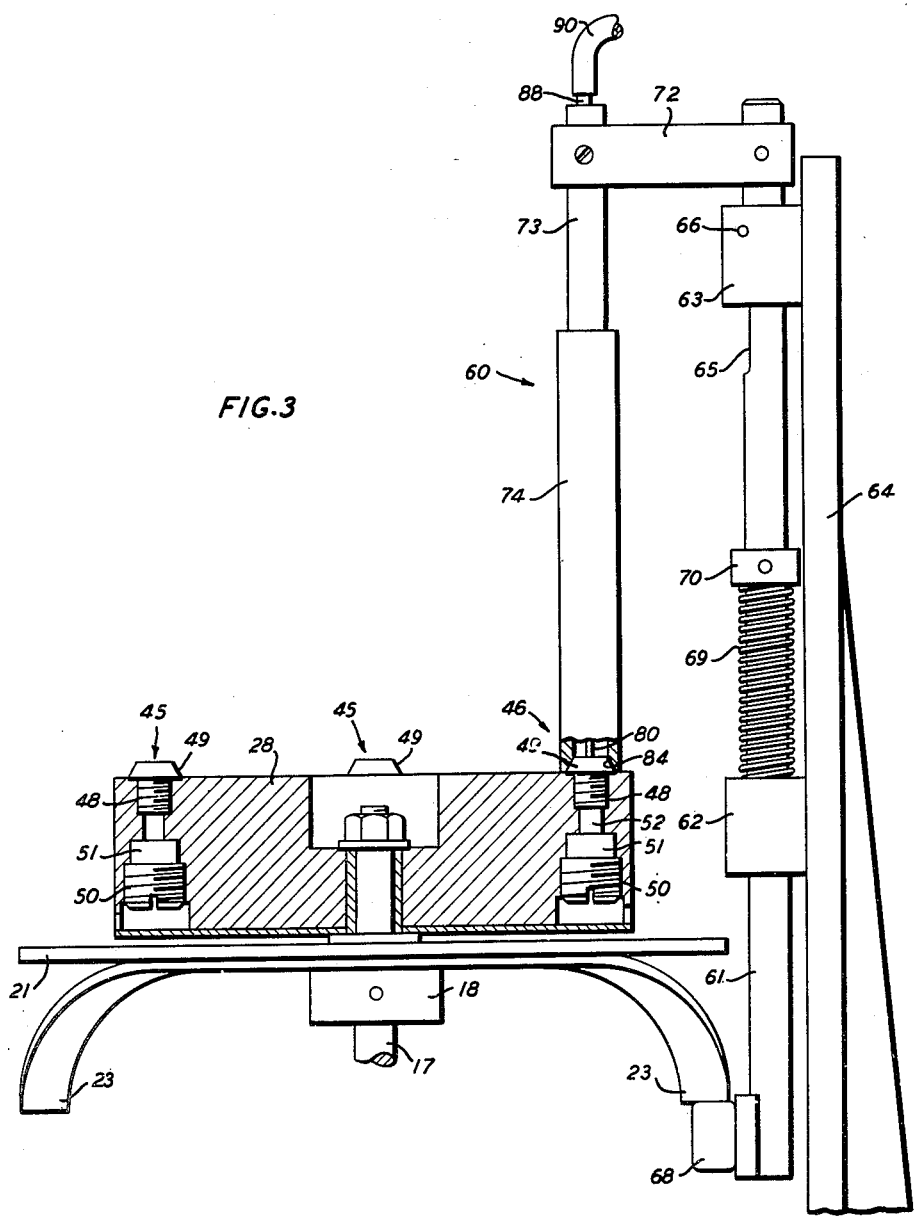

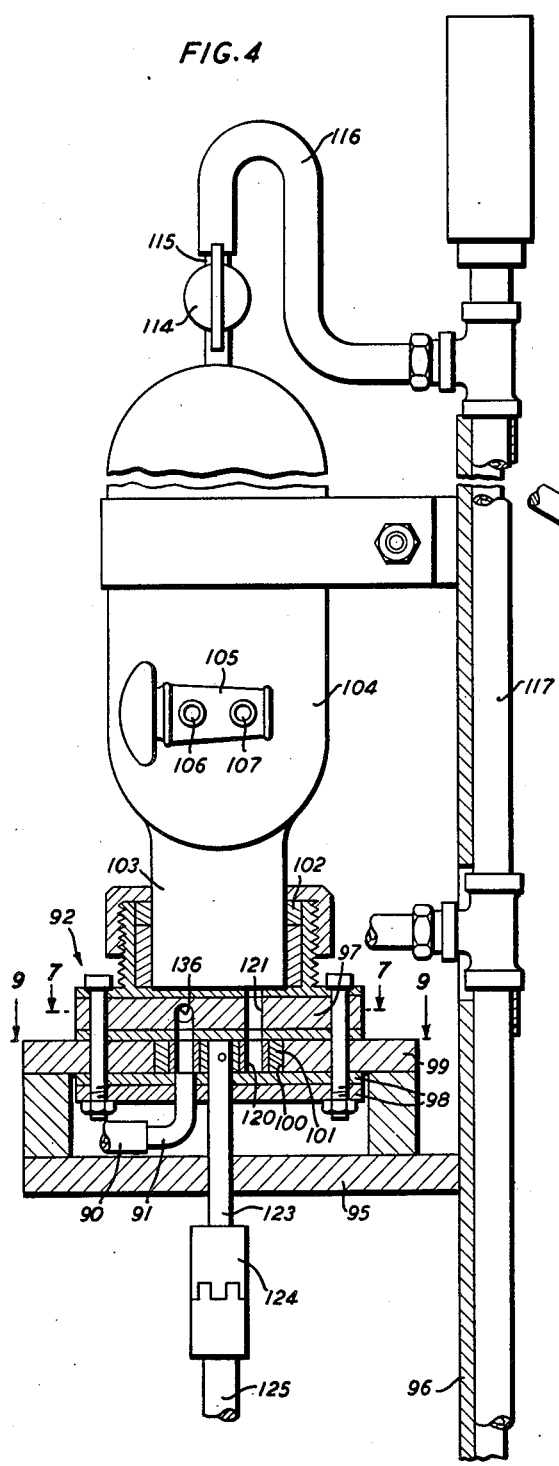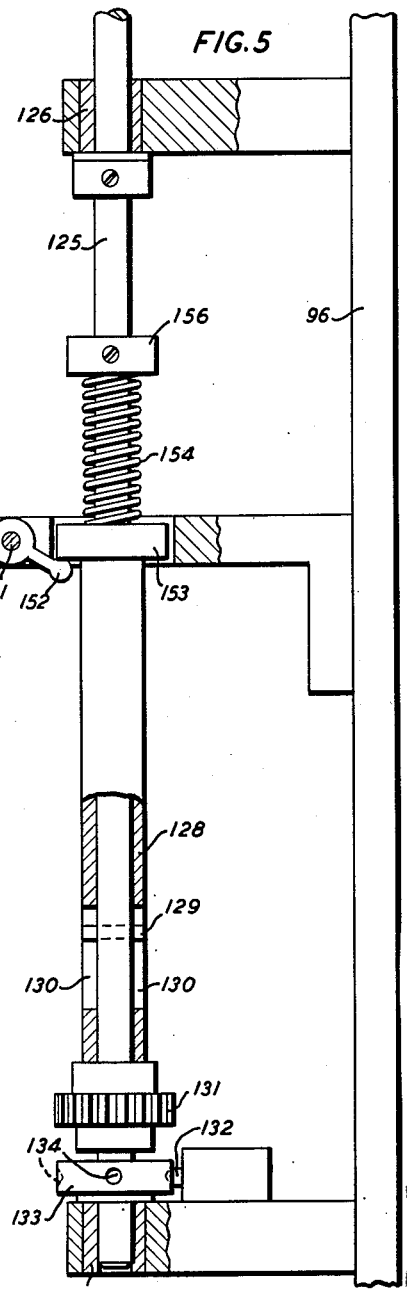

Nov. 25, 1952 — A. E. GEIGER ET AL — 2,619,274
FLUID FEEDING APPARATUS
Filed Jan. 27, 1950 — 6 Sheets—Sheet 5
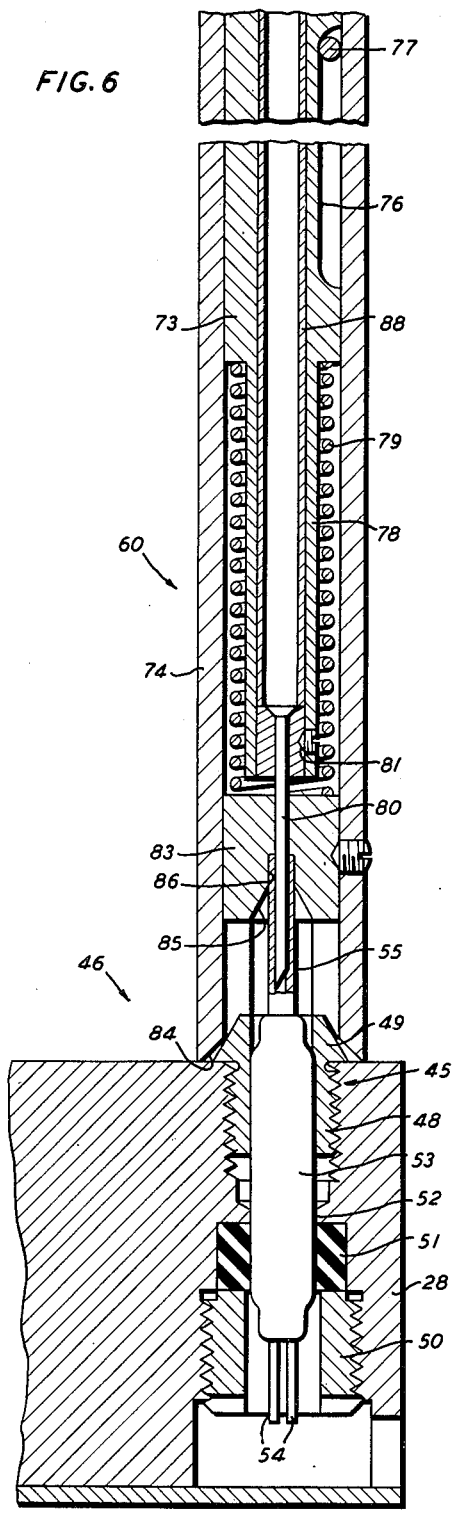
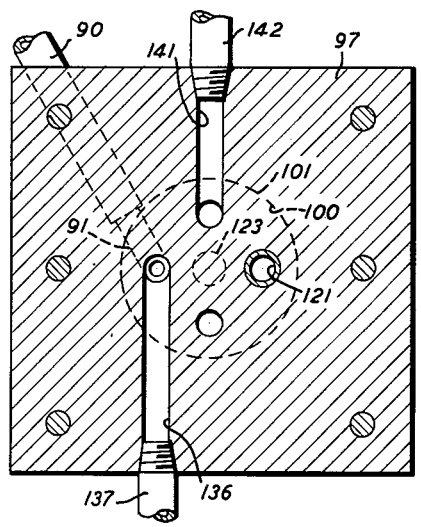
INVENTORS
A.E. GEIGER
H. ONALI
BY W.C. Parnell
ATTORNEY

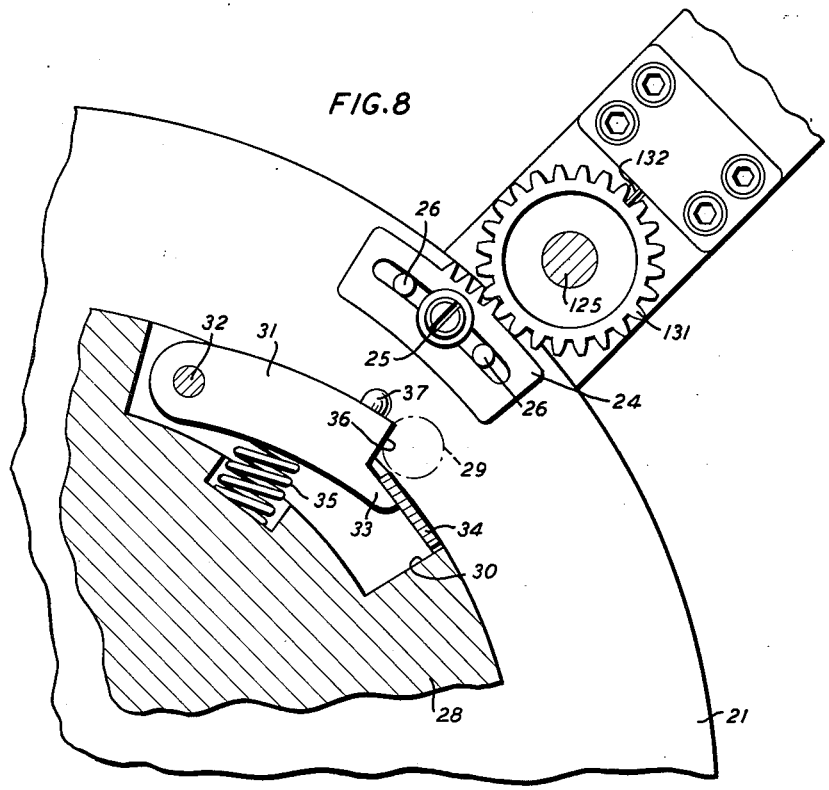
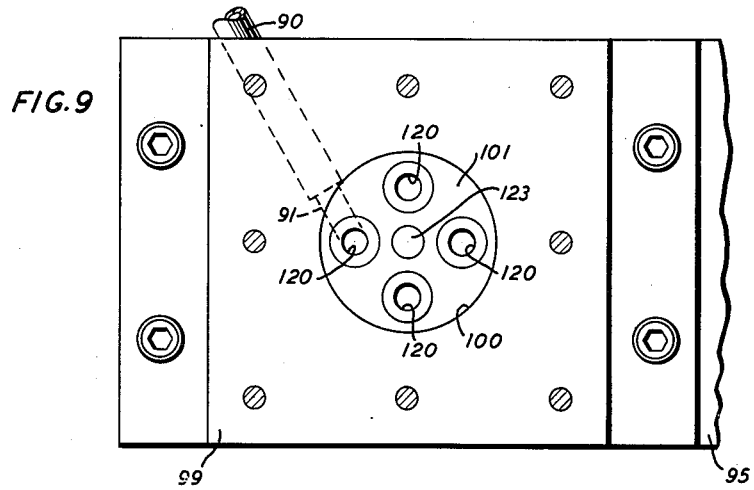
INVENTORS
A. E. GEIGER
H. ONALI
BY *W. C. Parnell*
ATTORNEY

Patented Nov. 25, 1952

2,619,274

UNITED STATES PATENT OFFICE 2,619,274

FLUID FEEDING APPARATUS

Albert E. Geiger, Wyckoff, N. J., and Hugo Onali, Allentown, Pa., assignors to Western Electric Company, Incorporated, New York, N. Y., a corporation of New York Application January 27, 1950, Serial No. 140,826

7 Claims. (Cl. 226—97)

1

This invention relates to apparatus for feeding measured quantities of a fluid into an article, and more particularly to apparatus for feeding measured quantities of mercury into mercury switches.

In a new design of mercury switch, a small diameter metal exhausting tube of the switch provides the only entrance for the mercury to be deposited in the switch. This and other requirements resulted in the need of a feeding apparatus of a particular design.

An object of the invention is to provide an apparatus capable of measuring quantities of a fluid such as mercury and depositing these quantities of fluids successively in small openings in like articles.

With this and other objects in view, the invention comprises an apparatus for feeding a measured quantity of a fluid into an article, the apparatus including a container for the fluid, a measuring unit supplied with the fluid from the container and means to actuate the unit whereby measured amounts of the fluid will be transmitted from the container to the article.

More specifically, the apparatus includes a fluid-tight, transparent mercury container which may be filled at intervals as required by first evacuating it and then connecting it to a mercury supply. The articles are placed successively in chucks in an intermittently moving turret actuated by a pin on a continuously rotating table. The table carries cams to move a locating element into registration with the article, to align it with a feeding element, and subsequently move the feeding element into the article prior to the time the measured quantities of the material are moved under the pressure of a gas through the feeding element and into the article. The feeding element in the present embodiment of the invention is substantially the size of a hypodermic needle positioned to enter the small tubular inlet of the article. The measuring unit is composed of an intermittently rotatable element having cavities which are successively evacuated, filled with mercury, emptied of the mercury and again evacuated.

Other objects and advantages will be apparent from the following detailed description when considered in conjunction with the accompanying drawings, wherein Fig. 1 is a top plan view of the apparatus;

Fig. 2 is a fragmentary side elevational view of the apparatus;

Fig. 3 is a fragmentary front elevational view of the apparatus, a portion thereof being shown in section;

2

Figure 1:
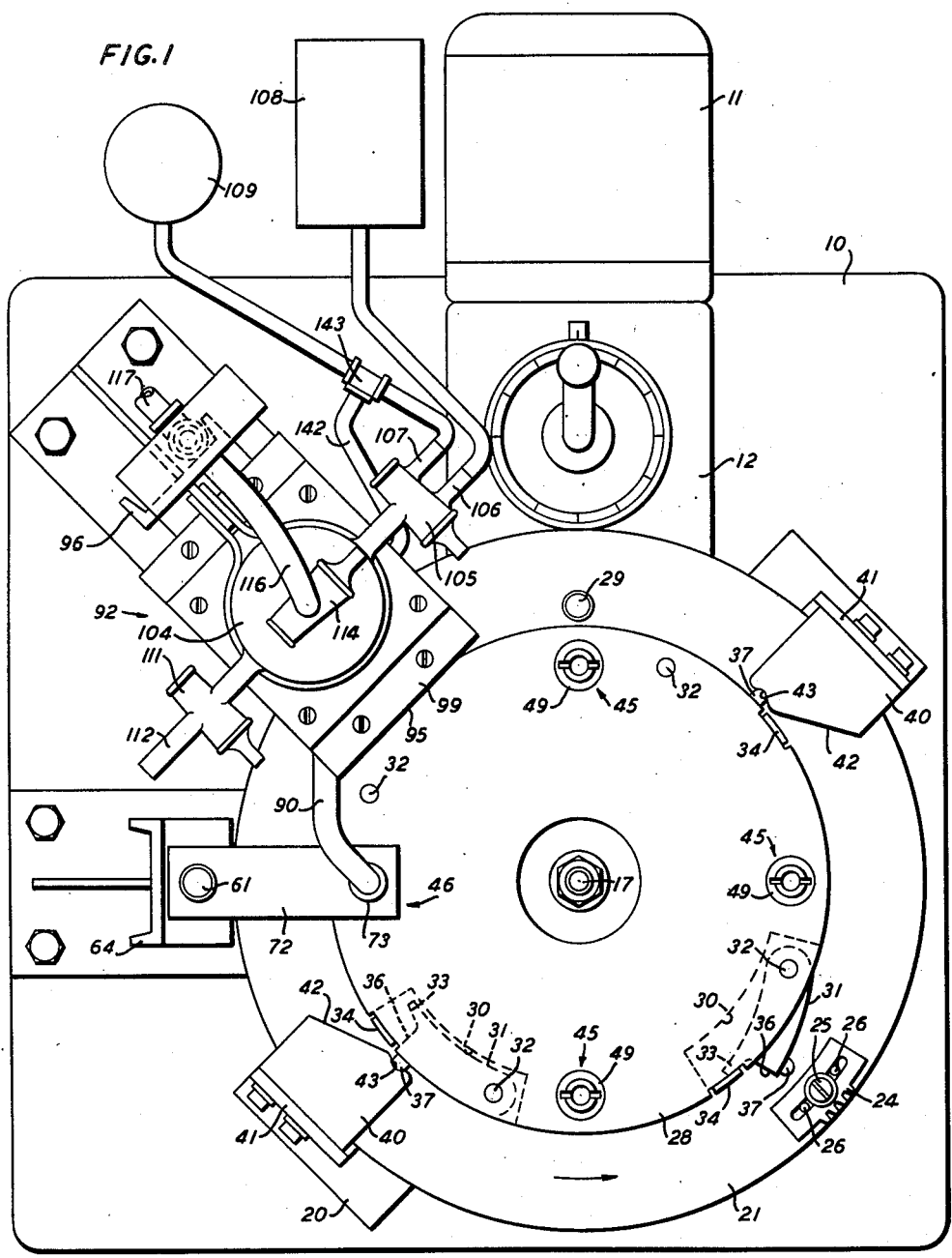

Fig. 4 is a fragmentary vertical sectional view of the measured unit showing the container and the gas feeding line;

Fig. 5 is a fragmentary side elevational view of the structure beneath that shown in Fig. 4;

Fig. 6 is an enlarged vertical sectional view of a portion of the turret during the feeding operation illustrating the locating and feeding mechanism;

Fig. 7 is an enlarged sectional view taken along the line 7—7 of Fig. 4;

Fig. 8 is an enlarged fragmentary sectional view of a portion of the table and turret illustrating the driving means for the measuring element of the measuring unit; and Fig. 9 is an enlarged sectional view taken along the line 9—9 of Fig. 4.

Referring now to the drawings, attention is first directed to Figs. 1 and 2 which illustrate a base 10 supporting a motor 11 and a gear reduction unit 12 driven by the motor. The output shaft 14 of the unit 12 drives a beveled gear 15 which in turn drives a beveled gear 16, the latter being fixedly mounted on a vertical shaft 17 extending upwardly through bearings in a bracket 18. The bracket 18 is mounted on a frame 20 supported by the base 10 and rotatably supports a table 21 which is fixed to the shaft 17 for continuous rotation therewith. Diametrically opposed cams 23 are mounted on the under surface of the table 21 for a purpose hereinafter described and gear segments 24 are adjustably mounted by the aid of nuts 25 and pins 26 (Fig. 8) at diametrically opposed positions on the upper surface of the table.

A turret 28 is supported for rotation about the axis of the shaft 17, but its motion is intermittent and being derived from a pin 29 mounted on the table 21 and extending vertically therefrom. The periphery of the turret 28 is recessed at 30 at four equally spaced positions (Figs. 1 and 8) to receive latches 31 pivotally mounted at 32 and having lip portions 33 to engage stops 34 when normally moved into their outer positions by their respective springs 35. The latches 31 are of suitable vertical dimensions whereby their pin engaging surfaces 36 may be moved into the path of the pin 29 while projections 37 of the latches are positioned above the path of the pin.

Stationary cams 40 (Figs. 1 and 2) are supported by vertical brackets 41 mounted on the frame 20 to position the cams above the table 21 and above the path of the pin 29, but in the path of the projections 37, whereby at given positions during the movement of the turret through the engagement of the pin 29 with one of the latches, the latch being engaged by the pin will be moved about its pivot and against the force of its spring 35 into its cavity 30 when the projection 37 rides upon a surface 42 of the adjacent cam moving the surface 36 of the latch free of the pin 29. A depressed portion 43 of each of the cams 40 receives the projections 37 successively to stop motion of the turret 28 at positions to accurately align the chucks 45 successively with the feeding position 46, and to latch the turret against accidental movement. The chucks 45 are identical in structure, four in number, and disposed 90° apart about the turret. One of the chucks is shown in detail in Fig. 6 and includes a hollow plug 48 threadedly disposed in an aperture of the turret 28 and having a truncated cone shaped upper end 49 positioned above the turret. A hollow plug 50 is mounted in the lower end of the aperture in the turret, its purpose being mainly to support the flexible annular member 51 which normally holds the article or mercury switch 52 at a given position and allows rocking movement thereof for alignment with the feeding unit. The article 52 has a glass casing 53 with lead wires 54 extending through one end thereof from the inner structure of the switch and a metal tube 55 extending from the other end thereof. The disclosure of the article in Fig. 6 is approximately twice the normal size of the article and it will be apparent therefore that the metal tube 55 is small in diameter.

At the feeding position 46, a feeding unit indicated generally at 60 (Figs. 3 and 6) is positioned and is under the control of the cams 23 to intermittently feed quantities of the material or mercury to the articles or switches 53 as they are advanced to the feeding position in their chucks 45. Considering first Fig. 3, the feeding unit includes a vertically reciprocable rod 61 supported for movement in guides 62 and 63, supported by a vertical bracket 64 mounted on the base 10. An upper portion of the rod 61 has a flattened surface 65 movable through the guide 63 relative to a pin 66 extending through the guide, the pin holding the rod 61 against rotation. A roller 68 mounted on the lower end of the rod 61 is caused to ride upon the cams 23 by a spring 69 normally urging the rod upwardly and being interposed between the guide 62 and a fixed collar 70 concentric with the rod.

A horizontal bar 72 connects the upper end of the rod 61 with a tubular member 73 which extends downwardly into a guide sleeve 74, attention being directed to Fig. 6. A cutaway portion 76 in the tubular member 73 receives a pin 77 extending through and carried by the guide sleeve 74 to permit relative movement longitudinally of the tube and sleeve but to hold them against relative rotation. The lower portion of the tubular member 73, as shown in Fig. 6, is reduced in outer diameter at 78 to receive a spring 79 to normally urge the guide sleeve 74 downwardly in advance of the tubular member 72 and a needle-like feeding element 80 mounted at 81 in the lower end of the tubular member. The element 80 is hollow throughout its length it being similar in structure to a hypodermic needle. An aligning member 83 is mounted in the guide sleeve 74 short of the lower tapered end 84 thereof and is apertured to receive feeding element 80 and the upper end of the tube 55 of each article to align the tube with the element 80 before this element is lowered into the tube. It will be noted that the aperture in the aligning member has a truncated cone shaped portion 85 which is centrally positioned with respect to an intermediate portion 86 similar in contour to the tube 55 of the article to receive the upper end of the tube and accurately align it with the element 80. The spring 79 applies its force to the guide sleeve 74 through the aligning member 83.

An inner tube 88, extending from the feeding element 80 upwardly through the tubular member 72, has one end of a flexible tube 90 connected thereto, the other end of the flexible tube being connected to a tubular member 91 (Fig. 4) leading from the outlet of the measuring unit indicated generaly at 92. The measuring unit 92 is supported by a frame structure 95 mounted on a vertical bracket 96 and includes an upper member 97, a lower member 98, a stationary central member 99 with a central aperture 100 and an intermittently rotatable measuring element 101 mounted in the aperture 100. The upper member 97 includes a fluid type seal 102 to receive and support the lower end 103 of a transparent container 104 for the material or mercury. The container includes a double valve 105 with inlets 106 and 107 connected respectively to a mercury supply 108 and a vaccum pump 109. Another valve 111 is provided with an outlet 112 to exhaust the material from the container, when so desired. A valve 114 is disposed at the top of the container, its inlet 115 being connected through a tube 116 to a gas supply line 117 through which nitrogen under a given pressure may be fed into the container as a means to force the mercury from the container into the measuring element 101.

The measuring element 101 is provided with four equally spaced cavities 120 of like dimensions to successively receive mercury through an inlet 121 (Fig. 4) and transfer measured quantities of mercury to the outlet 91. The measuring element 101 is secured to the upper end of a shaft 123 which is coupled at 124 to a shaft 125. The shaft 125 is journalled in suitable bearings 126 supported by the vertical bracket 86. A hollow shaft 128 is disposed concentric with the shaft 125 (Fig. 5) and is free to move axially thereof, but is held against relative rotation by a pin 129 extending through the shaft 125 and having its ends positioned in elongate apertures 130 in the hollow shaft. A pinion 131 is mounted on the lower end of the hollow shaft 128 and is normally positioned to be engaged by the gear segments 24 on the rotatable member or table 21. A spring pressed plunger 132 is positioned adjacent a wheel 133. The wheel 133 is mounted on the shaft 125, short of the lower end thereof, and provided with equally spaced recesses 134 to receive the outer end of the spring pressed plunger to effectively stop rotation of the shafts 123—125—128 at given positions to accurately locate the measuring element 101 with its cavities relative to the inlet 121 and outlet 91.

As shown in Figs. 4 and 7, the upper member 97 has a passageway 136 extending from a position adjacent the outlet 91 to a tubular member 137 which is connected to the supply line 117 for the gas or nitrogen under pressure. Nothing communicates with the second position between the inlet and the outlet. A passageway 141 extends from the fourth position to a tubular member 142 which extends through a connection 143 to the vacuum pump 109.

If it should be desirable to disconnect the feeding element, for example, when there is no article in one of the chucks 45, the operator may actuate a hand lever 150 about its pivot 151 to cause the ball shaped inner end 152 to move against a collar 153 on the hollow shaft 128, forcing it against the force of a spring 154 to move the hollow shaft with its pinion 131 upwardly out of possible engagement with either of the gear segments 24. The spring 154 is disposed concentric with the shaft 125 between the collar 153 and a collar 156 mounted on the shaft 125.

Considering now the operation of the apparatus, let it be assumed that a supply of mercury is disposed in the container 104. This supply of mercury may be placed in the container by first operating the valve 105 to open the inlet 107 to the vacuum pump, evacuating the container 104, after which the valve 105 is actuated to close the inlet 107 and open the inlet 106 resulting in the suction of mercury from the supply 108 into the container. The valve 105 is then closed, the valve 111 remaining closed and the valve 114 opened to admit nitrogen under pressure into the container. The articles 52 are fed successively to the chucks 45. When the motor 11 is energized driving the unit 12, the gears 15 and 16 and the shaft 17, the table or rotating element 21 is rotated continuously at a given speed, causing the pin 29 to move continuously in its circular path. By viewing Fig. 1, it will be noted that the latches 31 adjacent the cams 40 have been moved within their recesses 30, the cams receiving the projections 37 in the recesses 43 to hold the turret against movement while the pin continues its travel in the direction of the arrow. The pin 29 will eventually engage the latch not shown in Fig. 1, but disposed directly beneath the frame structure 95 as shown in broken lines in Fig. 8. When the pin 29 engages this latch, the turret 28 will move with the table 21 until the latch engaging the pin engages the next cam 40, the projection 37 thereof riding upon the surface 42 to a position shown in Fig. 1 where the surface 36 of the latch will be moved free of the pin allowing the pin to continue in its circular path while the cams 40 receive diametrically opposed latches, move them into their closed positions and hold the turret against rotation. In this manner, the turret is intermittently advanced, the pin engaging latches at diametrically opposed positions between the cams 40 and moving these latches with the turret until the latches are moved out of engagement with the pin. It will therefore be apparent that for each cycle of the pin, the turret has been moved through two quarter-cycle movements with intermediate periods of rest.

While the turret is at rest, the cams 23 moving continuously with the table 21 engage the roller 68 of the feeding mechanism to move the rod 61 downwardly against the force of its spring 69 moving the tubular member 72 downwardly toward the article at the feeding position. The spring 79 moves the guide sleeve 74 in advance of the tubular member 72 causing the leading end thereof to be positioned over the chuck at the feeding position and the locating member 83 to extend downwardly over the upper end of the tube 55 of the article to accurately locate the tube and the article when the sleeve 74 comes to rest upon the turret. Further movement of the tubular member 73 downwardly will be against the force of the spring 79, this movement guiding the feeding element through its aperture into the aligned tube 55 and article. When in this position, the measured quantities of material in the cavity of the measuring element 101 registering with the outlet 91 will be forced by nitrogen under pressure through the various passageways, tubes and element 80 into the article 52.

The feeding unit is then moved free of the turret and the article by the roller 67 riding upon the low portion of the adjacent cam 23 allowing the spring 69 to move the rod 61 upwardly, moving the tubular member 73 upwardly until the pin 77 reaches the lower end of its cutaway portion 76 at which time the guide sleeve 74 will be moved upwardly, the feeding element 80 having been removed from the tube of the article.

The gear segments 24 are positioned on and movable with the continuously moving table 21 so that they will engage and move the pinion 131 one-quarter of a revolution to intermittently rotate the measuring element 101 to advance its cavities through complete operating cycles. These cavities are first evacuated after which they are moved into the loading position in alignment with the inlet 121 after which they are moved into an intermediate position and then into registration with the outlet 91 where the measured amounts of mercury received from the container at the inlet are forced by gas under pressure from the cavity at the outlet. After leaving the outlet 91, the cavities are again evacuated before they again reach the loading position. In the present embodiment of the invention, all parts of the measuring unit which may contact the mercury are made of special materials to prevent mercury amalgamation. This may be true of the other structures leading from the measured unit until the mercury is fed into the article.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In an apparatus for feeding measured quantities of a fluid to successive articles, a turret mounted for intermittent rotary motion about a given axis, means disposed at spaced positions in the turret to removably receive and support the articles, a driving member movable in a continuous path about the axis, latches movably supported by the turret at spaced positions about the axis, a feeding unit disposed at a feeding position relative to the turret to feed quantities of a fluid successively to the articles as they are moved into the feeding position, means normally urging the latches into the path of the driving member to cause driving of the turret with the member, and units to actuate the latches to disconnect them from the driving member after the turret has been moved the distance between each article supporting means.

2. In an apparatus for feeding measured quantities of a fluid to successive articles, a turret mounted for intermittent rotary motion about a given axis, means disposed at spaced positions in the turret to removably receive and support the articles, a driving member movable in a continuous path about the axis, latches movably supported by the turret at spaced positions about the axis, a feeding unit disposed at a feeding position relative to the turret to feed quantities of a fluid successively to the articles as they are moved into the feeding position, means normally urging the latches into the path of the driving member to cause driving of the turret with the member, a projection carried by each latch, and a cam-like unit mounted adjacent the periphery of the turret in the path of the projections to be engaged thereby to move the latches free of the driving member and thereafter hold the latch with the turret against movement until the driving member engages the next latch.

3. An apparatus for feeding measured quantities of a fluid to successive articles comprising a turret mounted for intermittent rotary motion about its axis, holders disposed at spaced positions in the turret to removably receive the articles, a reciprocable feeding unit disposed at a feeding position, a driving member movable in a continuous path about the axis, latches movably supported by the turret at spaced positions about the axis, means normally urging the latches into the path of the driving member to cause driving of the turret with the member, units to actuate the latches to disconnect them from the driving member to successively position the holders with the articles at the feeding position, and cam means movable with the driving member to cause reciprocation of the feeding unit to feed the quantities of fluid into the articles.

4. An apparatus for feeding measured quantities of fluid to hollow articles comprising a turret mounted for rotation about its axis having holders for the articles at spaced positions adjacent its periphery, a supply of fluid, a measuring unit with an inlet to receive fluid from the supply, an outlet and an element with cavities rotatable to transfer measured quantities of the fluid from the inlet to the outlet, a reciprocable feeding unit to receive the quantities of fluid from the outlet and feed them to the articles at a feeding position, and a continuously rotatable driving mechanism including means to intermittently rotate the turret to move the holders with their articles successively into the feeding position, means operable after each intermittent movement of the turret to reciprocate the feeding unit into and out of engagement with the articles at the feeding position, and means operable in timed relation with the feeding unit to rotate the element of the measuring unit to cause the measured quantities of fluid to be moved through the feeding unit into the articles successively.

5. An apparatus for feeding measured quantities of fluid to hollow articles comprising a turret mounted for rotation about its axis having holders for the articles at spaced positions adjacent its periphery, a supply of fluid, a measuring unit with an inlet to receive fluid from the supply, an outlet and an element with cavities rotatable to transfer measured quantities of the fluid from the inlet to the outlet, a reciprocable feeding unit to receive the quantities of fluid from the outlet and feed them to the articles at a feeding position, latches carried by the turret, a table rotatable continuously about the turret axis, a projection carried by the table to successively engage the latches to move the table to advance the articles successively to the feeding position, means carried by the table to reciprocate the feeding unit into and out of engagement with the articles at the feeding position, and means carried by the table to rotate the element of the measuring unit in timed relation with the reciprocation of the feeding unit to cause the measured quantities of fluid to be transferred from the supply through the feeding unit and into the articles successively.

6. An apparatus for feeding measured quantities of fluid to hollow articles comprising a turret mounted for rotation about its axis having holders for the articles at spaced positions adjacent its periphery, a supply of fluid, a measuring unit with an inlet to receive fluid from the supply, an outlet and an element with cavities rotatable to transfer measured quantities of the fluid from the inlet to the outlet, a reciprocable feeding unit to receive the quantities of fluid from the outlet and feed them to the articles at a feeding position, latches carried by the turret, a table rotatable continuously about the turret axis, a projection carried by the table to successively engage the latches to move the table to advance the articles successively to the feeding position, cams carried by the table to control reciprocation of the feeding unit into and out of engagement with the articles at the feeding position, and means carried by the table to rotate the element of the measuring unit in timed relation with the reciprocation of the feeding unit to cause the measured quantities of fluid to be transferred from the supply through the feeding unit and into the articles successively.

7. An apparatus for feeding measured quantities of fluid to hollow articles comprising a turret mounted for rotation about its axis having holders for the articles at spaced positions adjacent its periphery, a supply of fluid, a measuring unit with an inlet to receive fluid from the supply, an outlet and an element with cavities rotatable to transfer measured quantities of the fluid from the inlet to the outlet, a reciprocable feeding unit to receive the quantities of fluid from the outlet and feed them to the articles at a feeding position, latches carried by the turret, a table rotatable continuously about the turret axis, a projection carried by the table to successively engage the latches to move the table to advance the articles successively to the feeding position, cams carried by the table to control reciprocation of the feeding unit into and out of engagement with the articles at the feeding position, a shaft for the element of the measuring unit, a pinion mounted thereon adjacent the table, and gear segments mounted on the table and movable therewith to engage the pinions at given intervals to rotate the element in timed relation with the reciprocation of the feeding unit to cause the measured quantities of fluid to be transferred from the supply through the feeding unit and into the articles successively.

ALBERT E. GEIGER.
HUGO ONALI.

REFERENCES CITED

The following references are of record in the file of this patent:

UNITED STATES PATENTS

| Number | Name | Date |
|---|---|---|
| 304,063 | Barker | Aug. 28, 1884 |
| 1,257,012 | Munn | Feb. 19, 1918 |
| 1,425,735 | Yeomans | Aug. 15, 1922 |
| 1,871,311 | Fagan | Aug. 9, 1932 |
| 1,904,924 | Nielsen | Apr. 18, 1933 |
| 2,176,449 | Ayars | Oct. 17, 1939 |
| 2,326,296 | Harrison et al. | Aug. 10, 1943 |
| 2,518,064 | Rapisarda | Aug. 8, 1950 |

FOREIGN PATENTS

| Number | Country | Date |
|---|---|---|
| 581,656 | Great Britain | Oct. 21, 1946 |
| 747,383 | France | June 15, 1933 |